United States Patent
Yan et al.

(10) Patent No.: US 12,242,779 B2
(45) Date of Patent: Mar. 4, 2025

(54) MACHINE LEARNING-BASED METHOD FOR DESIGNING HIGH-STRENGTH HIGH-TOUGHNESS STEEL

(71) Applicant: University of Science and Technology Beijing, Beijing (CN)

(72) Inventors: Yu Yan, Beijing (CN); Ruize Sun, Beijing (CN); Mingxing Lu, Beijing (CN); Yanjing Su, Beijing (CN); Lijie Qiao, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 889 days.

(21) Appl. No.: 17/386,967

(22) Filed: Jul. 28, 2021

(65) Prior Publication Data

US 2022/0335182 A1   Oct. 20, 2022

(30) Foreign Application Priority Data

Apr. 19, 2021   (CN) .......................... 202110419561.5

(51) Int. Cl.
*G06F 30/27* (2020.01)
*G06F 111/06* (2020.01)

(52) U.S. Cl.
CPC .......... *G06F 30/27* (2020.01); *G06F 2111/06* (2020.01)

(58) Field of Classification Search
CPC .............................. G06F 30/27; G06F 2111/06
See application file for complete search history.

(56) References Cited

U.S. PATENT DOCUMENTS

2020/0257933 A1*   8/2020   Steingrimsson .......... B22F 5/04

FOREIGN PATENT DOCUMENTS

EP   3293683 A1 *   3/2018   ......... G05B 13/0265

OTHER PUBLICATIONS

Shen, C., Wang, C., Wei, X., Li, Y., van der Zwaag, S., & Xu, W. (2019). Physical metallurgy-guided machine learning and artificial intelligent design of ultrahigh-strength stainless steel. Acta Materialia, 179, 201-214. (Year: 2019).*

* cited by examiner

*Primary Examiner* — Bijan Mapar
(74) *Attorney, Agent, or Firm* — Troutman Pepper Hamilton Sanders LLP; James E. Schutz; Christopher C. Close, Jr.

(57) ABSTRACT

A machine learning-based method for designing a high-strength high-toughness steel, including: (S1) obtaining data and filling in missing parts to form a data set; (S2) selecting feature data in the data set to form a standard data set; (S3) constructing two machine learning models of the high-strength high-toughness steel; (S4) completing training after the two models are evaluated to be qualified; (S5) finding frontier points, drawing a Pareto front, and distinguishing a known region and a feature space; (S6) in the feature space, setting a step for the feature data, drawing a grid space, and performing multiple training predictions on each grid point by using the models, to obtain predicted Gaussian distributions of two objectives; and (S7) searching for an expected improvement point through an efficient global optimization algorithm, and obtaining design parameter values of corresponding features.

6 Claims, 5 Drawing Sheets

MACHINE LEARNING-BASED METHOD FOR DESIGNING HIGH-STRENGTH HIGH-TOUGHNESS STEEL

CROSS REFERENCE TO RELATED APPLICATIONS

This patent application claims the benefit and priority of Chinese Patent Application No. 202110419561.5 filed on Apr. 19, 2021, the disclosure of which is incorporated by reference herein in its entirety as part of the present application.

TECHNICAL FIELD

The present disclosure relates to the technical field of steel materials, and in particular to a machine learning-based method for designing a high-strength high-toughness steel.

BACKGROUND ART

High-strength high-toughness steels are widely used in aerospace, vehicles and engineering bridges, etc., due to extremely high strength and optimal welding properties. High strength always causes low ductility, and this contradiction has not been well resolved yet. Martensitic steels are the representative of high-strength high-toughness steels. Martensitic steels are usually treated through heat treatment including quenching and tempering. To be specific, a metal workpiece is heated to a suitable temperature for a period of time and then immersed in a quenching medium for rapid cooling. The quenched martensitic steel is then heated to a temperature below the critical point A1 (the temperature at which the pearlite starts to transform into austenite when heated), held for a certain period of time, and then cooled to room temperature. Brine, water, mineral oil, air, and the like are the commonly used quenching media. The matrix structure in the martensitic steel, martensite, provides high strength for the steel, and the suitable amount of stable retained austenite contributes to toughness.

However, currently, a standard composition and process system has not been formed for the martensitic steel, and it is difficult to balance between strength and toughness of the martensitic steel, resulting in difficulty in meeting the needs of some usage scenarios. Therefore, the optimization of multiple properties of the high-strength steel is one of the current research focuses. With the advent of the era of big data, the material research model has gradually shifted from "experience guided experiment" to a new model of "combination of theoretical prediction and experimental verification". As an important tool in the era of big data, the machine learning algorithm shows its unique advantages in materials development and design. It can learn the relationship between input (feature) and output (objective) on the basis of material data, such as the relationship among the compositions, the process, and mechanical properties. A model constructed through machine learning can predict the material properties. On this basis, the machine learning model is combined with some heuristic algorithms to predict properties corresponding to an unknown feature combination, that is, to design the material. In recent years, relevant scholars have used machine learning models to directly predict properties of many steels, and analyze each feature parameter to study its impact on the objective. However, machine learning-based prediction alone is not a good way for feature design. Therefore, combining the machine learning model with some optimization algorithms for material design is a key research direction.

SUMMARY

The purpose of the present disclosure is to provide a machine learning-based method for designing a high-strength high-toughness steel, to help the designer find a feature combination conveniently and quickly, so as to design the composition and process of the high-strength high-toughness steel, and optimize the strength and toughness properties of the high-strength steel.

To implement the foregoing objectives, the present disclosure provides the following solutions:

A machine learning-based method for designing a high-strength high-toughness steel includes:

(S1) obtaining compositions, processes, ultimate tensile strengths and tensile elongations corresponding to multiple high-strength high-toughness steels, and filling in missing data parts to form a data set;

(S2) selecting feature data in the data set to form a standard data set;

(S3) preprocessing the feature data in the standard data set, and constructing two machine learning models based on the preprocessed feature data, where the feature data corresponding to the compositions and the processes of the high-strength high-toughness steels is used as input variables, and the ultimate tensile strengths and the tensile elongations are used as output variables;

(S4) evaluating the two machine learning models with a determination coefficient $R^2$ as an evaluation indicator; and when the two machine learning models are evaluated to be unqualified, adjusting setting parameters thereof, and continuing to train the two machine learning models; or when the two machine learning models are evaluated to be qualified, completing training of the two machine learning models;

(S5) finding frontier points based on the two trained machine learning models with a concept of non-dominated solution, drawing a Pareto front, and distinguishing between a known region and a feature space;

(S6) in the feature space, setting a step for the feature data corresponding to the compositions and the processes, drawing a grid space, and performing multiple training predictions on each grid point by using the two machine learning models evaluated to be qualified in the step (S4), to obtain predicted Gaussian distributions of two objectives; and (S7) searching for an expected improvement point I in the predicted Gaussian distributions of the objectives through an efficient global optimization algorithm, obtaining design parameter values of corresponding features, and feeding the design parameter values back to a designer.

Optionally, the step (S1) of obtaining the compositions, the processes, the ultimate tensile strengths and the tensile elongations corresponding to the multiple high-strength high-toughness steels, and filling in the missing data parts to form the data set may include:

(S101) obtaining the compositions, the processes, the ultimate tensile strengths and the tensile elongations corresponding to the multiple high-strength high-toughness steels, where the high-strength high-toughness steels are martensitic steels, the composition includes constituent elements and contents of the martensitic steel, and the process includes an austenitizing temperature and time, a cooling rate, a tempering temperature and time of the martensitic steel, where the cooling rate is a number representing a common quenching medium; and (S102) replacing the missing data parts with a mean of a variable in each dimension to form the data set.

Optionally, in the step (S2), a method for selecting the feature data in the data set includes a manual selection method and an algorithm selection method, where the manual selection method is to artificially ignore features with a small data amount and a narrow range and features with inaccurate data affected by a measurement precision; and the algorithm selection method examines importance of features relative to the objectives, and selects features that are important to the objectives and have low-correlation to each other, and the algorithm selection method adopts Spearman correlation coefficient algorithm.

Optionally, the step (S3) of preprocessing the feature data in the standard data set, and constructing the two machine learning models based on the preprocessed feature data may include following steps, where the feature data corresponding to the compositions and the processes of the high-strength high-toughness steels is used as input variables, and the ultimate tensile strengths and the tensile elongations are used as output variables:

(S301) standardizing the feature data in the standard data set, to standardize scales of the feature data in different dimensions;

(S302) dividing the preprocessed feature data into K-1 training sets and 1 test set, and performing K-fold cross-validation; and (S303) constructing the two machine learning models, where the feature data corresponding to the compositions and the processes of the high-strength high-toughness steels are used as the input variables, and the ultimate tensile strengths and the tensile elongations are used as the output variables.

Optionally, in the step (S4), the determination coefficient $R^2$ is used as the evaluation indicator, an evaluation criterion is that the determination coefficient $R^2$ is greater than 95%, and a formula for calculating the determination coefficient $R^2$ may be:

$$R^2(y, y^p) = 1 - \frac{\sum_{i=1}^{n}(y_i - y_i^p)^2}{\sum_{i=1}^{n}(y_i - \bar{y}_i)^2},$$

where y is real data, $y^p$ is predicted data, $y_i$ and $y_i^p$ are respectively a real value and a predicted value of an $i^{th}$ data point, and $\bar{y}_i$ is a mean of the real data y.

Optionally, the step (S7) of searching for the expected improvement point I in the predicted Gaussian distributions of the objectives through the efficient global optimization algorithm, obtaining design parameter values of the corresponding features, and feeding the design parameter values back to the designer may include:

(S701) searching for the expected improvement point I in the predicted Gaussian distributions of the objectives through the efficient global optimization algorithm:

$$I = y(x^r) - f^{max}(x),$$

where $y(x^r)$ is a prediction point on a grid of the feature space, and $f^{max}(x)$ is a frontier point in the known region on the front; and (S702) calculating an expected improvement value E(I) of the expected improvement point:

$$E(I) = P(I) \cdot L,$$

where P(I) is an improvement probability:

$$P(I) = P[y \geq f^{max}(x)] = \int_{f^{max}(x)}^{\infty} \frac{1}{\sigma \cdot \sqrt{2\pi}} \exp\left(-\frac{(y-\mu)^2}{2\sigma^2}\right) = \phi\left(\frac{y-\mu}{\sigma}\right),$$

where μ and σ are respectively a mean and standard deviation of a predicted Gaussian distribution of an objective value of the expected improvement point;

L is an improvement magnitude:

$$L = \max\{\min(\mu_1 - y_1, \mu_2 - y_2), 0\},$$

where $\mu_1$ and $\mu_2$ are respectively means of predicted Gaussian distributions of two objective values of the expected improvement point, and $y_1$ and $y_2$ are respectively the two objective values on the Pareto front; and (S703) selecting top-ranked grid points based on the expected improvement value E(I), obtaining the design parameter values of the corresponding features, and feeding the design parameter values back to the designer.

Optionally, the method may further include the following steps after the step (S7):

(S8) smelting and heat-treating a sample based on the design parameter values of the corresponding features selected in the step (S7), and processing the sample into a tensile sample for testing, where features that are not involved are all controlled variables; and (S9) performing slow strain rate testing on the tensile sample to obtain the ultimate tensile strengths and the tensile elongations of the tensile sample.

Based on the specific embodiments provided in the present disclosure, the following technical effects are provided: The machine learning—based method for designing a high-strength high-toughness steel provided in the present disclosure uses a machine learning model (support vector regression (SVR) model) under the guidance of feature engineering to establish a relationship among the composition, the process, the ultimate tensile strengths and the tensile elongations of the high-strength high-toughness steel, uses the concept of Pareto front to distinguish the known region and the search space, and further uses the efficient global optimization (EGO) algorithm to find the possible expected improvement point in the feature space, to complete feature design and optimize the two objectives. Compared with the traditional trial and error method, this method is simple, efficient, and feasible.

BRIEF DESCRIPTION OF THE DRAWINGS

In order to explain the technical solutions in embodiments of the present disclosure or in the prior art more clearly, the accompanying drawings required in the embodiments will be described below briefly. Apparently, the accompanying drawings in the following description show merely some embodiments of the present disclosure, and other drawings can be derived from these accompanying drawings by those of ordinary skill in the art without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other examples obtained by a person of ordinary skill in the art based on the examples of the present disclosure without creative efforts shall fall within the protection scope of the present disclosure.

The purpose of the present disclosure is to provide a machine learning—based method for designing a high-strength high-toughness steel, to help the designer find a feature combination conveniently and quickly, so as to design the composition and process of the high-strength high-toughness steel, and optimize the strength and toughness properties of the high-strength steel.

To make the foregoing objective, features, and advantages of the present disclosure clearer and more comprehensible, the present disclosure will be further described in detail below with reference to the accompanying drawings and specific embodiments.

Figure 1:
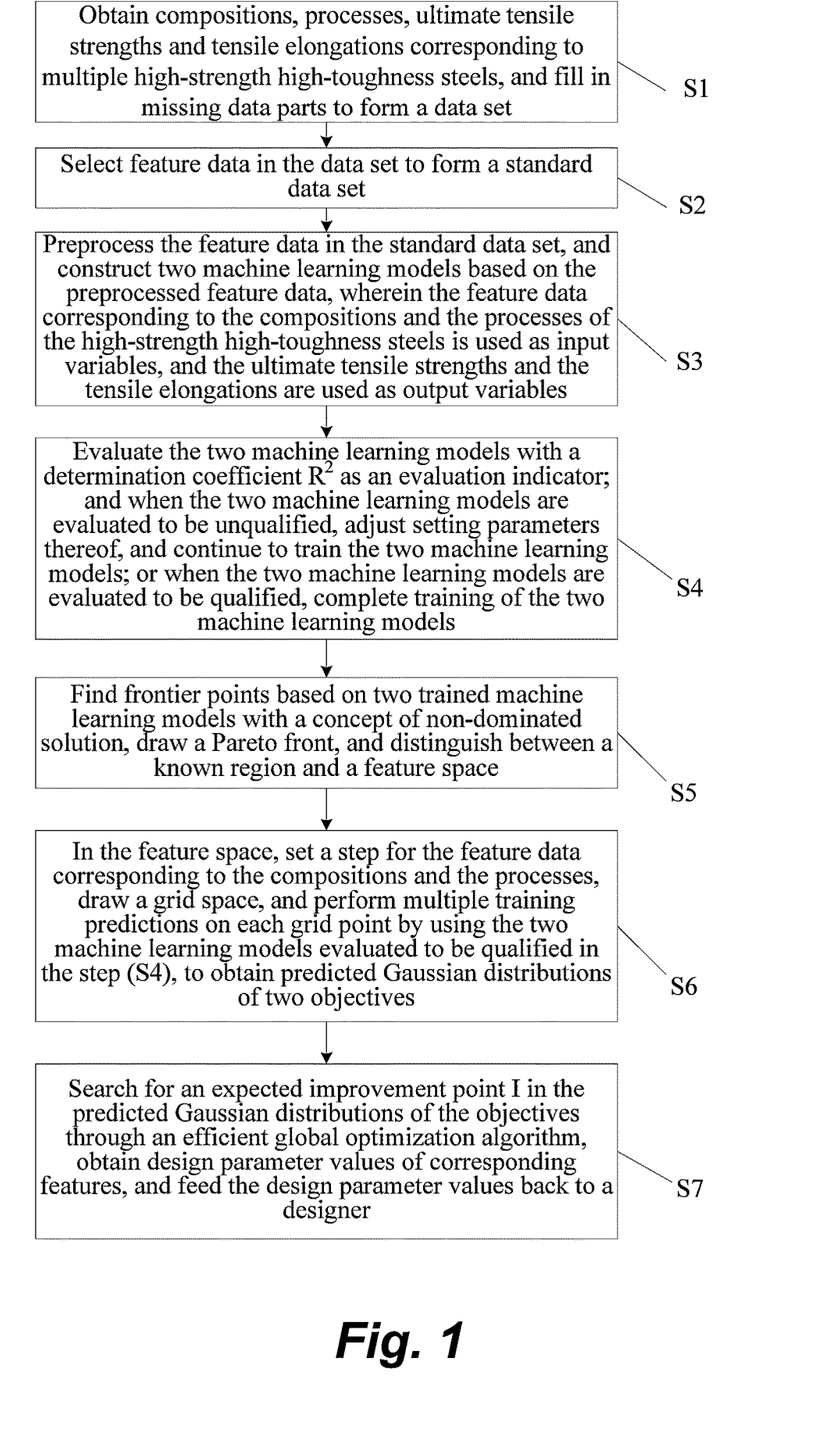
FIG. 1 is a flowchart of a method according to an embodiment of the present disclosure.

As shown in FIG. 1, a machine learning-based method for designing a high-strength high-toughness steel provided in an embodiment of the present disclosure includes the following steps:

(S1) Compositions, processes, ultimate tensile strengths and tensile elongations corresponding to multiple high-strength high-toughness steels are obtained, and missing data parts are filled to form a data set.

(S2) Feature data in the data set are selected to form a standard data set.

(S3) The feature data in the standard data set are preprocessed, and two machine learning models are constructed based on the preprocessed feature data, where the feature data corresponding to the compositions and the processes of the high-strength high-toughness steels is used as input variables, and the ultimate tensile strengths and the tensile elongations are used as output variables.

(S4) The two machine learning models are evaluated with a determination coefficient $R^2$ as an evaluation indicator; and when the two machine learning models are evaluated to be unqualified, setting parameters thereof are adjusted, and the two machine learning models continue to be trained, where the setting parameters of the machine learning models are a penalty coefficient C and a distance error epsilon; or when the two machine learning models are evaluated to be qualified, training of the two machine learning models are completed. In the embodiments of the present disclosure, in the step (S4), the determination coefficient $R^2$ is used as the evaluation indicator, an evaluation criterion is that the determination coefficient $R^2$ is greater than 95%, and a formula for calculating the determination coefficient $R^2$ may be:

$$R^2(y, y^p) = 1 - \frac{\sum_{i=1}^{n}(y_i - y_i^p)^2}{\sum_{i=1}^{n}(y_i - \bar{y}_i)^2},$$

where y is real data, $y^p$ is predicted data, $y_i$ and $y_i^p$ are respectively a real value and a predicted value of an $i^{th}$ data point, and $\bar{y}_i$ is a mean of the real data y.

Alternatively, one or more of the error evaluation indicators such as the mean absolute error (MAE), mean absolute percentage error (MAPE) and root mean squared error (RMSE) may be used as the evaluation indicator, or may be used in combination with the determination coefficient $R^2$ as the evaluation indicator. When the determination coefficient $R^2$ is closer to 1, it indicates higher model fitting and more accurate model prediction. When the above error evaluation indicators are closer to 0, it indicates smaller deviation of the model prediction and more accurate model prediction. With reference to this, the evaluation criteria for the error evaluation indicators may be set as needed. A formula for calculating the MAE is given below:

$$MAE = \frac{1}{n}\sum_{i=1}^{n}|y_i - y_i^p|.$$

Formulas for calculating the other error evaluation indicators are also conventional, which are not given here.

Figure 2:
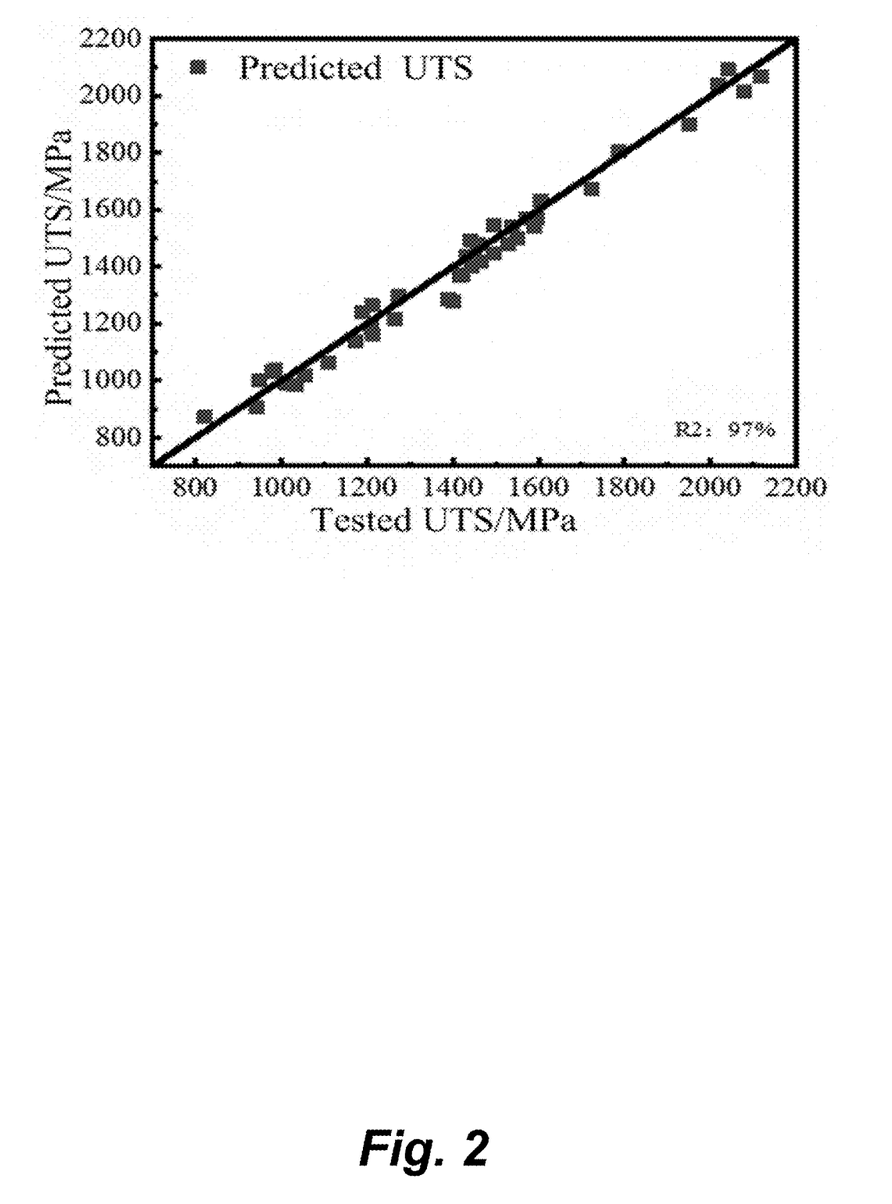
FIG. 2 is a diagram of prediction results of the the ultimate tensile strengths according to an embodiment of the present disclosure.
Figure 3:
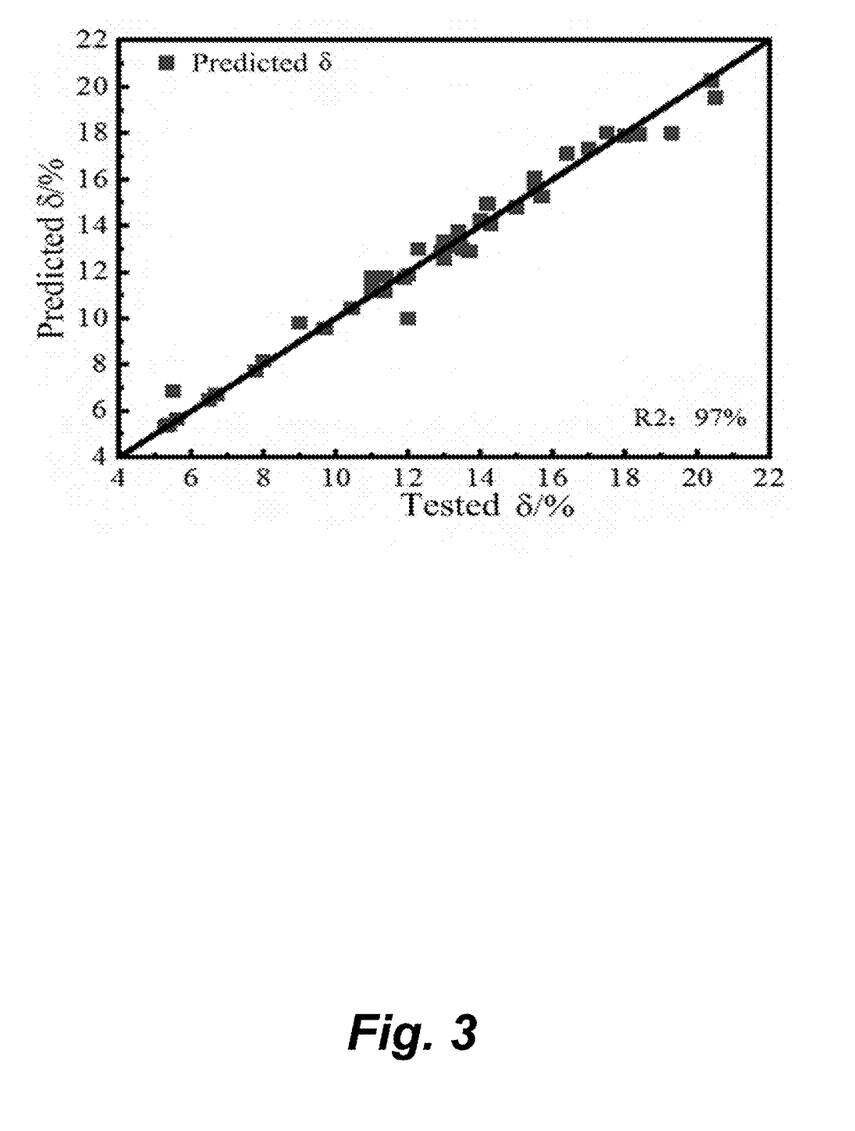
FIG. 3 is a diagram of prediction results of the the tensile elongations according to an embodiment of the present disclosure.

As shown in FIG. 2 and FIG. 3, the determination coefficient $R^2$ of the two machine learning models in the embodiments of the present disclosure are both 97% greater than 95% required by the evaluation standard, and the training of the two machine learning models is completed.

Figure 4:
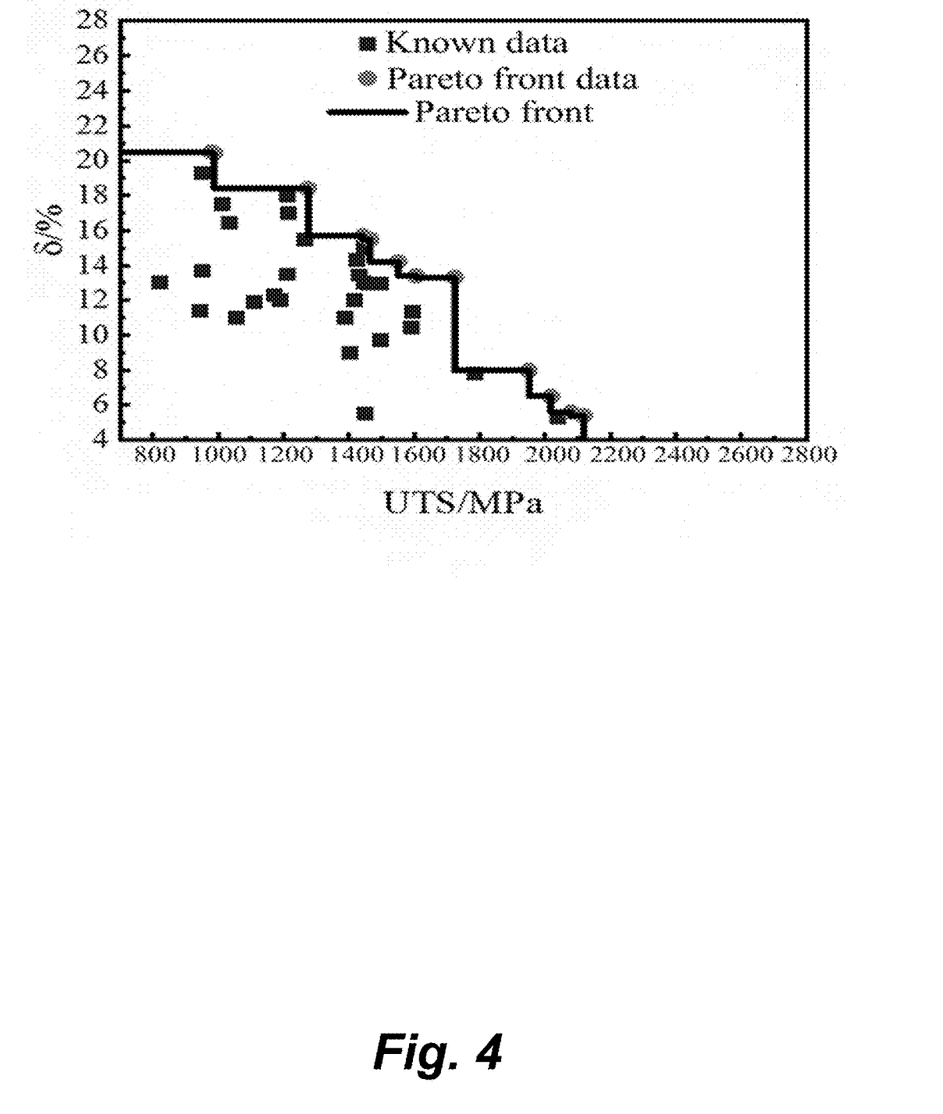
FIG. 4 is a diagram of a Pareto front according to an embodiment of the present disclosure.

(S5) Frontier points are found based on the two trained machine learning models with a concept of non-dominated solution. As shown in FIG. 4, a Pareto front is drew. The non-dominated solution is defined as follows: If for any $y_1(x)$ and $y_2(x)$, there is $y_i(x^r) \geq y_i(x)(i=1,2)$, or there is at least one i=1,2 satisfying $y_i(x^r) > y_i(x)$, $x^r$ is referred to as a non-dominated solution to x relative to other solutions. A stepped plane formed by a set of non-dominated solutions is the Pareto front, and then a known region is distinguished from a feature space.

(S6) In the feature space, a step for the feature data corresponding to the compositions and the processes is set, a grid space is drawn, and multiple training predictions are performed on each grid point by using the two machine learning models evaluated to be qualified in the step (S4), to obtain predicted Gaussian distributions of the two objectives.

(S7) An expected improvement point I is searched for in the predicted Gaussian distributions of the objectives through an EGO algorithm, design parameter values of the corresponding features are obtained, and fed back to a designer.

The step (S1) of obtaining compositions, processes, ultimate tensile strengths and tensile elongations corresponding to multiple high-strength high-toughness steels, and filling in missing data parts to form a data set may specifically include the following steps:

(S101) The compositions, the processes, the ultimate tensile strengths and the tensile elongations corresponding to the multiple high-strength high-toughness steels are obtained, where the high-strength high-toughness steels are martensitic steels, the composition includes constituent elements (excluding Fe) and contents of the martensitic steel, and the process includes austenitizing temperature and time, a cooling rate, and tempering temperature and time of the martensitic steel, where the cooling rate is a number representing a common quenching medium. In the embodiments of the present disclosure, 20, 80, 138 and 250 respectively represent four kinds of quenching matters of air, oil, water, and brine.

(S102) The missing data parts is replaced with a mean of a variable in each dimension to form the data set. If a content of an element C is missing, a mean of other unmissed contents of the element C is used to replace the missing value.

In the step (S2), a method for selecting the feature data in the data set includes a manual selection method and an algorithm selection method. The manual selection method is to artificially ignore features with a small data amount and a narrow range and features with inaccurate data affected by a measurement precision, and in the embodiments, the features Ti, W, V, Nb, P and S are ignored. The algorithm selection method first examines importance of features relative to the objectives, and in the embodiments, the Random Forest (RF) algorithm is used. The algorithm selection method second examines a correlation between the feature and the objectives, and in the embodiments, Spearman correlation coefficient is used, and the objectives are the ultimate tensile strengths (UTSs) and the tensile elongations (TELs). Herein, features that are important to the objectives and have low-correlation to each other are selected, and in the embodiments, six composition features, namely, C, Si, Mn, Cr, Ni, and Mo and three process features, namely, the austenitizing temperature (TA), the cooling rate (CR), and the tempering temperature (Th) are selected. The data distribution in the standard data set is shown in Table 1:

TABLE 1

Data distribution in the standard data set

| | Input and output | Maximum value | Minimum value | Mean | Standard deviation |
|---|---|---|---|---|---|
| Input | C(wt. %) | 0.43 | 0.004 | 0.17 | 0.15 |
| | Si(wt. %) | 1.5 | 0.03 | 0.51 | 0.49 |
| | Mn(wt. %) | 1.91 | 0.02 | 0.83 | 0.64 |
| | Cr(wt. %) | 16.5 | 0 | 2.91 | 5.48 |
| | Ni(wt. %) | 18.84 | 0 | 5.76 | 7.25 |
| | Mo(wt. %) | 4.84 | 0 | 1.31 | 1.74 |
| | TA(° C.) | 1230 | 820 | 964 | 118 |
| | CR | 250 | 20 | 92 | 68 |
| | Th(° C.) | 700 | 200 | 430 | 151 |
| Output | UTS(MPa) | 2118 | 822 | 1385 | 331 |
| | TEL(%) | 20.5 | 5.3 | 12.6 | 4.02 |

The step (S3) of preprocessing the feature data in the standard data set, and constructing two machine learning models $SVR_{rbf}$-UTS and $SVR_{rbf}$-δ based on the preprocessed feature data may specifically include the following steps, where the feature data corresponding to the compositions and the processes of the high-strength high-toughness steels is used as input variables, and the ultimate tensile strengths and the tensile elongations are used as output variables:

(S301) The feature data in the standard data set are standardized, to standardize scales of the feature data in different dimensions; and a principal component analysis (PCA) is conducted, where the standardization process is performed through the sci-kit learn library, and a standardized calculation formula is as follows:

$$z = \frac{x - \mu}{\sigma},$$

where z is standardized data, x is initial data, μ is a mean of a variable in each dimension in the initial data, and σ is a standard deviation of a variable in each dimension in the initial data.

(S302) The preprocessed feature data are divided into K-1 training sets and 1 test set, and perform K-fold cross-validation. In the embodiments of the present disclosure, K=5. To be specific, the preprocessed feature data are divided into four training sets representing 75% training sets and one test set representing 25% test set to perform 5-fold cross-validation.

(S303) The two machine learning models are constructed, where the feature data corresponding to the compositions and the processes of the high-strength high-toughness steels is used as the input variables, and the ultimate tensile strengths and the tensile elongations are used as the output variables.

In the step (S6), the step is set for the feature data corresponding to the compositions and the processes in the feature space, and the grid space is drew. The feature space is as shown in Table 2. In the embodiments of the present disclosure, 500 training predictions are performed on each grid point by using the two machine learning models evaluated to be qualified in the step (S4), to obtain the predicted Gaussian distributions of the two objectives.

TABLE 2

Feature space table

| Feature | Range | Step | Type |
|---|---|---|---|
| C(wt. %) | 0.1-0.3 | 0.1 | 3 |
| Si(wt. %) | 0.1-1.0 | 0.3 | 4 |
| Mn(wt. %) | 0.1-1.6 | 0.5 | 4 |
| Cr(wt. %) | 0-1.2 | 0.3 | 5 |
| Ni(wt. %) | 0-6 | 1.5 | 5 |
| Mo(wt. %) | 0-6 | 1.5 | 5 |
| TA(° C.) | 800-1250 | 50 | 10 |
| Th(° C.) | 200-560 | 40 | 10 |
| CR | 20/80/138/250 | / | 4 |

The step (S7) of searching for the expected improvement point I in the predicted Gaussian distributions of the objectives through the EGO algorithm, obtaining design parameter values of the corresponding features, and feeding them back to the designer may specifically include the following steps:

(S701) The expected improvement point I in the predicted Gaussian distributions of the objectives through the EGO algorithm:

$$I = y(x^r) - f^{max}(x),$$

where $y(x^r)$ is a prediction point on a grid of the feature space, and $f^{max}(x)$ is a frontier point in the known region on the front.

(S702) An expected improvement value E(I) of the expected improvement point:

$$E(I) = P(I) \cdot L,$$

where, P(I) is an improvement probability:

$$P(I) = P[y \geq f^{max}(x)] = \int_{f^{max}(x)}^{\infty} \frac{1}{\sigma \cdot \sqrt{2\pi}} \exp\left(-\frac{(y-\mu)^2}{2\sigma^2}\right) = \phi\left(\frac{y-\mu}{\sigma}\right),$$

where μ and σ are respectively a mean and standard deviation of a predicted Gaussian distribution of an objective value of the expected improvement point;

L is an improvement magnitude:

$$L=\max\{\min(\mu_1-y_1,\mu_2-y_2),0\},$$

where $\mu_1$ and $\mu_2$ are respectively means of predicted Gaussian distributions of two objective values of the expected improvement point, and $y_1$ and $y_2$ are respectively the two objective values on the Pareto front.

(S703) Top-ranked grid points are selected based on the expected improvement value E(I), the design parameter values of the corresponding features are obtained, and then fed back to the designer. The selected objectives and corresponding features in the embodiments of the present disclosure are shown in Table 3:

TABLE 3

Selected objectives and corresponding features

| C/ % | Si/ % | Mn/ % | Cr/ % | Ni/ % | Mo/ % | $T_A$/ °C. | CR | $T_h$/ °C. | UTS/ MPa | TEL/ % |
|---|---|---|---|---|---|---|---|---|---|---|
| 0.3 | 0.7 | 1.1 | 0.6 | 6 | 1.5 | 900 | 80 | 440 | 1771 | 11 |

The method may further include the following steps after the step (S7):

(S8) A sample is smelt and heat-treated based on the design parameter values of the corresponding features selected in the step (S7), and processed into a tensile sample for testing, where the features and objectives of the actual sample are shown in Table 4, the sample is processed into a dog bone test sample with the standard distance of 15 mm, the width of 4 mm, and the thickness of 1.5 mm, and features that are not involved are all controlled variables.

TABLE 4

Features and objectives of the actual sample

| C/ % | Si/ % | Mn/ % | Cr/ % | Ni/ % | Mo/ % | $T_A$/ °C. | CR | $T_h$/ °C. | UTS/ MPa | TEL/ % |
|---|---|---|---|---|---|---|---|---|---|---|
| 0.3 | 0.74 | 1.12 | 0.82 | 6.03 | 1.57 | 900 | 80 | 440 | 2083 | 14.2 |

Figure 5:
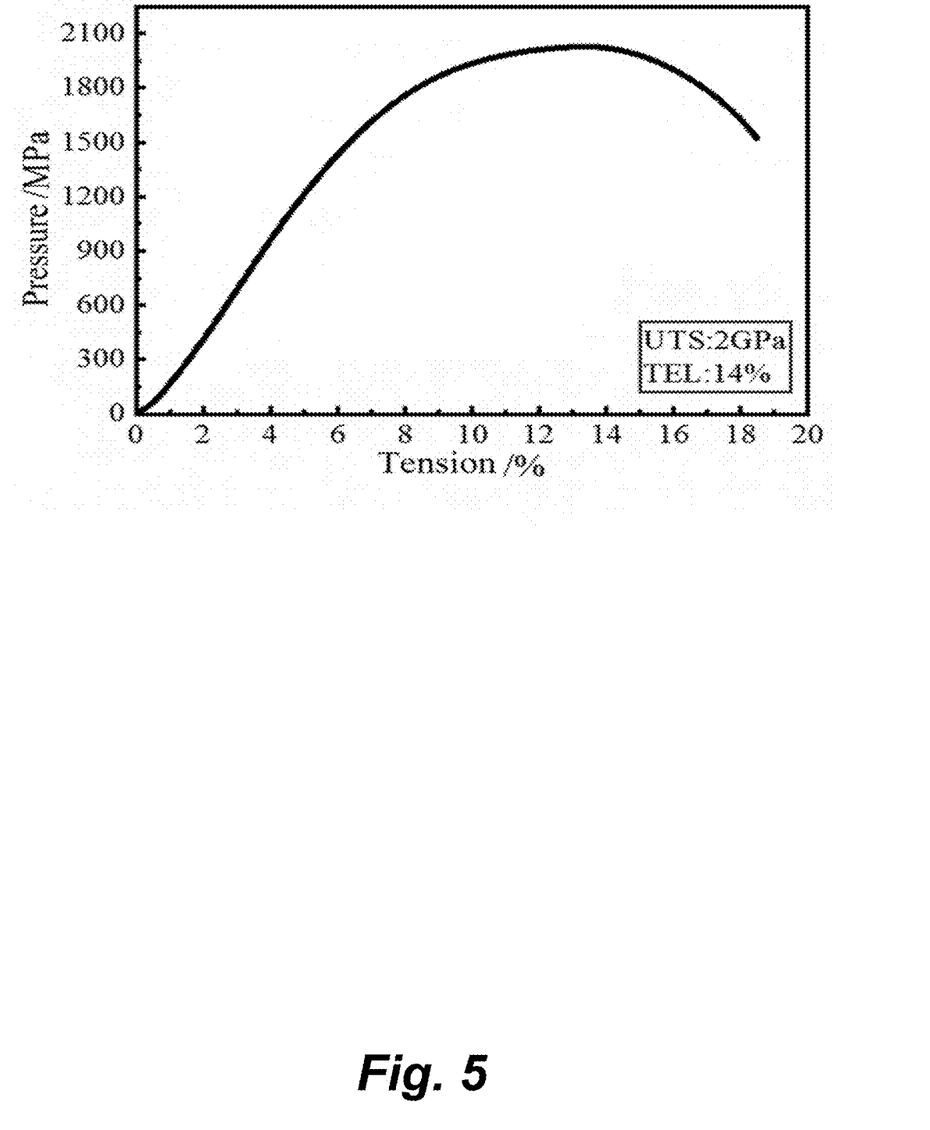
FIG. 5 is a property diagram of the objectives corresponding to the features according to an embodiment of the present disclosure.

(S9) a slow strain rate testing (SSRT) at a strain rate of $1\times10^{-4}$/s is performed on the tensile sample to obtain its ultimate tensile strengths and tensile elongations, which are shown in FIG. 5.

The machine learning-based method for designing a high-strength high-toughness steel provided in the present disclosure uses a machine learning model (support vector regression (SVR) model) under the guidance of feature engineering to establish a relationship among the composition, the process, the ultimate tensile strengths and the tensile elongations of the high-strength high-toughness steel, uses the concept of Pareto front to distinguish the known region and the search space, and further uses the EGO algorithm to find the possible expected improvement point in the feature space, to complete feature design and optimize the two objectives. Compared with the traditional trial and error method, this method is simple, efficient, and feasible.

In this specification, several specific embodiments are used for illustration of the principles and implementations of the present disclosure. The description of the foregoing embodiments is used to help illustrate the method of the present disclosure and the core ideas thereof. In addition, persons of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. A machine learning-based method for designing a high-strength high-toughness steel, comprising:
   (S1) obtaining compositions, processes, ultimate tensile strengths and tensile elongations corresponding to multiple high-strength high-toughness steels, and filling in missing data parts to form a data set;
   (S2) selecting feature data in the data set to form a standard data set;
   (S3) preprocessing the feature data in the standard data set, and constructing two machine learning models based on the preprocessed feature data, wherein the feature data corresponding to the compositions and the processes of the high-strength high-toughness steels is used as input variables, and the ultimate tensile strengths and the tensile elongations are used as output variables;
   (S4) evaluating the two machine learning models with a determination coefficient $R^2$ as an evaluation indicator; and when the two machine learning models are evaluated to be unqualified, adjusting setting parameters thereof, and continuing to train the two machine learning models; or when the two machine learning models are evaluated to be qualified, completing training of the two machine learning models;
   (S5) finding frontier points based on the two trained machine learning models with a concept of non-dominated solution, drawing a Pareto front, and distinguishing between a known region and a feature space;
   (S6) in the feature space, setting a step for the feature data corresponding to the compositions and the processes, drawing a grid space, and performing multiple training predictions on each grid point by using the two machine learning models evaluated to be qualified in the step (S4), to obtain predicted Gaussian distributions of two objectives;
   (S7) searching for an expected improvement point I in the predicted Gaussian distributions of the objectives through an efficient global optimization algorithm, obtaining design parameter values of corresponding features, and feeding the design parameter values back to a designer;
   (S8) smelting and heat-treating a sample based on the design parameter values of the corresponding features selected in the step (S7), and processing the sample into a tensile sample for testing, wherein features that are not involved are all controlled variables; and
   (S9) performing slow strain rate testing on the tensile sample to obtain the ultimate tensile strengths and the tensile elongations of the tensile sample.

2. The machine learning-based method for designing the high-strength high-toughness steel according to claim 1, wherein the step (S1) of obtaining the compositions, the processes, the ultimate tensile strengths and the tensile elongations corresponding to the multiple high-strength high-toughness steels, and filling in the missing data parts to form the data set comprises:
   (S101) obtaining the compositions, the processes, the ultimate tensile strengths and the tensile elongations corresponding to the multiple high-strength high-toughness steels, wherein the high-strength high-toughness steels are martensitic steels, the composition comprises constituent elements and contents of the martensitic steel, and the process comprises an austenitizing temperature and time, a cooling rate, a tempering temperature and time of the martensitic steel, wherein the cooling rate is a number representing a common quenching medium; and (S102) replacing the missing data parts with a mean of a variable in each dimension to form the data set.

3. The machine learning-based method for designing the high-strength high-toughness steel according to claim 1, wherein in the step (S2), a method for selecting the feature data in the data set comprises a manual selection method and an algorithm selection method, wherein the manual selection method is to artificially ignore features with a small data amount and a narrow range and features with inaccurate data affected by a measurement precision; and the algorithm selection method examines importance of features relative to the objectives, and selects features that are important to the objectives and have low-correlation to each other, and the algorithm selection method adopts Spearman correlation coefficient algorithm.

4. The machine learning-based method for designing the high-strength high-toughness steel according to claim 1, wherein the step (S3) of preprocessing the feature data in the standard data set, and constructing the two machine learning models based on the preprocessed feature data comprises following steps, wherein the feature data corresponding to the compositions and the processes of the high-strength high-toughness steels is used as input variables, and the ultimate tensile strengths and the tensile elongations are used as output variables:

(S301) standardizing the feature data in the standard data set, to standardize scales of the feature data in different dimensions;

(S302) dividing the preprocessed feature data into K-1 training sets and 1 test set, and performing K-fold cross-validation; and (S303) constructing the two machine learning models, wherein the feature data corresponding to the compositions and the processes of the high-strength high-toughness steels is used as the input variables, and the ultimate tensile strengths and the tensile elongations are used as the output variables.

5. The machine learning-based method for designing the high-strength high-toughness steel according to claim 1, wherein in the step (S4), the determination coefficient $R^2$ is used as the evaluation indicator, an evaluation criterion is that the determination coefficient $R^2$ is greater than 95%, and a formula for calculating the determination coefficient $R^2$ is:

$$R^2(y, y^p) = 1 - \frac{\sum_{k=1}^{n}(y_i - y_i^p)^2}{\sum_{k=1}^{n}(y_i - \bar{y}_i)^2},$$

wherein, y is real data, $y^p$ is predicted data, $y_i$ and $y_i^p$ are respectively a real value and a predicted value of an $i^{th}$ data point, and $\bar{y}_i$ is a mean of the real data y.

6. The machine learning-based method for designing the high-strength high-toughness steel according to claim 1, wherein the step (S7) of searching for the expected improvement point I in the predicted Gaussian distributions of the objectives through the efficient global optimization algorithm, obtaining design parameter values of the corresponding features, and feeding the design parameter values back to the designer comprises:

(S701) searching for the expected improvement point I in the predicted Gaussian distributions of the objectives through the efficient global optimization algorithm:

$I=y(x^r)-f^{max}(x)$, wherein, $y(x^r)$ is a prediction point on a grid of the feature space, and $f^{max}(x)$ is a frontier point in the known region on the front; and (S702) calculating an expected improvement value E (I) of the expected improvement point:

$E(I)=P(I)\cdot L$, wherein, P(I) is an improvement probability:

$$P(I) = P[y \geq f^{max}(x)] = \int_{f^{max}(x)}^{\infty} \frac{1}{\sigma \cdot \sqrt{2\pi}} \exp\left(-\frac{(y-\mu)^2}{2\sigma^2}\right) = \phi\left(\frac{y-\mu}{\sigma}\right),$$

wherein, μ and σ are respectively a mean and standard deviation of a predicted Gaussian distribution of an objective value of the expected improvement point; L is an improvement magnitude:

$L=\max\{\min(\mu_1-y_1,\mu_2-y_2),0\}$, wherein, $\mu_1$ and $\mu_2$ are respectively means of predicted Gaussian distributions of two objective values of the expected improvement point, and $y_1$ and $y_2$ are respectively two objective values on the Pareto front; and (S703) selecting top-ranked grid points based on the expected improvement value E(I), obtaining the design parameter values of the corresponding features, and feeding the design parameter values back to the designer.

* * * * *